United States Patent [19]

Seymour

[11] 4,229,200

[45] Oct. 21, 1980

[54] DROP FORMING GLASS SHEETS WITH AUXILIARY SHAPING MEANS

[75] Inventor: Samuel L. Seymour, Oakmont, Pa.

[73] Assignee: PPG Industries, Inc., Pittsburgh, Pa.

[21] Appl. No.: 44,443

[22] Filed: Jun. 1, 1979

Related U.S. Application Data

[63] Continuation-in-part of Ser. No. 960,404, Nov. 13, 1978, abandoned.

[51] Int. Cl.³ .............................................. C03B 23/02
[52] U.S. Cl. .................................... 65/106; 65/104; 65/107; 65/268; 65/273; 65/25.2
[58] Field of Search .................. 65/104, 106, 107, 268, 65/273, 275, 25 A

[56] References Cited

U.S. PATENT DOCUMENTS

| | | | |
|---|---|---|---|
| 3,148,968 | 9/1964 | Cypher et al. | 65/106 |
| 3,223,501 | 12/1965 | Fredley et al. | 65/25 A |
| 3,332,759 | 7/1967 | McMaster et al. | 65/25 A |
| 3,476,540 | 11/1969 | Ritter et al. | 65/107 |
| 3,507,639 | 4/1970 | Seymour | 65/104 |
| 3,573,889 | 4/1971 | McMaster et al. | 65/62 |
| 3,600,150 | 8/1971 | Rougeux | 65/268 |
| 3,607,187 | 9/1971 | McMaster | 65/106 |
| 3,676,098 | 7/1972 | Hall | 65/106 |
| 3,682,613 | 8/1972 | Johnson et al. | 65/275 X |
| 3,690,856 | 9/1972 | Bryan | 65/287 |
| 3,701,643 | 10/1972 | Frank | 65/62 |
| 3,713,799 | 1/1973 | McMaster | 65/273 |
| 3,846,104 | 11/1974 | Seymour | 65/104 |
| 3,869,271 | 3/1975 | Shaffer et al. | 65/273 |
| 3,973,943 | 8/1976 | Seymour | 65/348 |
| 4,092,141 | 5/1978 | Frank et al. | 65/114 |

*Primary Examiner*—Arthur D. Kellogg
*Attorney, Agent, or Firm*—Dennis G. Millman

[57] ABSTRACT

Heat softened glass sheets are held by a flat vacuum platen, portions of the glass sheet are pre-shaped by auxiliary shaping means while the glass sheet is being held, and then the glass sheet is dropped onto a shaping mold to impart the complete desired curvature to the glass sheet.

13 Claims, 28 Drawing Figures

DROP FORMING GLASS SHEETS WITH AUXILIARY SHAPING MEANS

CROSS-REFERENCE TO RELATED APPLICATION

This application is a continuation-in-part of U.S. application Ser. No. 960,404, filed on Nov. 13, 1978 now abandoned.

BACKGROUND OF THE INVENTION

This invention relates to the bending of sheets of thermoplastic material, especially glass. Many techniques for bending glass sheets are known. Perhaps the simplest technique is to heat a glass sheet while supported on a contoured mold and to permit the glass sheet to sag into conformity with the mold. However, it is often desirable to speed the process by applying a mechanical bending force such as by pressing the glass between a pair of contoured molds. A particularly advantageous press bending process is shown in U.S. Pat. No. 3,846,104 to S. L. Seymour wherein a horizontally oriented glass sheet is heated and lifted by a lower bending mold into contact with an upper bending mold where it is retained by vacuum while the lower bending mold retracts. Then a tempering ring receives the bent glass sheet and conveys it from the bending station into a tempering station. That arrangement is especially advantageous in that it provides contoured support for the bent glass sheet during the tempering step and frees the bending station for initiating the next bending cycle while tempering of the first glass sheet is being carried out. A drawback to such an arrangement is that three major components of the apparatus, the upper and lower forming molds and the tempering ring, must all be custom fabricated for each different shape produced on such a bending and tempering line. It would be desirable not only to reduce the cost of fabricating these elements with each shape change, but also to reduce the down time of the bending and tempering line necessitated by the installation of these elements with each product change.

In U.S. Pat. No. 3,713,799 to H. A. McMaster, a similar arrangement is disclosed, but in which the lower shaping mold serves to carry the bent glass sheet into the tempering station, thus delaying the commencement of the next bending cycle until the lower bending ring deposits the glass sheet in the tempering station and returns to the bending station. Likewise, in this arrangement a product change requires a major retooling of the bending station since the upper and lower forming molds as well as the gas support block into which the lower forming mold recesses, all must conform to the shape of the glass sheets being processed. A similar arrangement in U.S. Pat. No. 3,573,889 to H. A. McMaster et al. has the same drawback.

U.S. Pat. Nos. 3,507,639 to S. L. Seymour and 3,676,098 to H. R. Hall both show horizontal press bending arrangements wherein only two elements, the upper and lower bending molds, need to be custom fabricated for each glass shape being produced. It would be desirable to reduce the number of custom made parts even further. Furthermore, in both of these arrangements the edges of the bent glass sheets are not supported as they are conveyed from the bending station into the tempering station.

U.S. Pat. No. 3,476,540 to Ritter et al. discloses a glass bending arrangement whereby the inertia of a single vertically rising lower bending mold effects the bending. Disadvantageously, the bent glass sheets must pass without edge support along a roller conveyor into the tempering zone.

U.S. Pat. No. 3,600,150 to Rougeux shows a glass bending arrangement wherein a heat-softened glass sheet is slipped from a roller conveyor onto a flexible hammock and thereafter press bent between upper and lower forming molds. The purpose of the flexible hammock is to support the glass sheet initially out of contact with the rigid shaping mold surfaces. It is apparent that a major reconstruction of the apparatus would be required when a change in the glass shape is desired.

While the drop forming method and apparatus disclosed in the parent application Ser. No. 960,404 overcome many of the problems mentioned above, additional versatility in shaping glass sheets with such a process to a wider variety of shapes would be highly desirable. In particular, it would be desirable to enhance the capability of producing shapes having sharply bent portions, reverse curvature "S" bends, "V" bends, or exceptionally deep bends.

SUMMARY OF THE INVENTION

In the drop forming method of shaping glass sheets a single shaping mold conforming to the outline and contour of the bent glass sheet is employed, onto which a heat-softened glass sheet is dropped to impart the bending force to the glass. Immediately after each glass sheet leaves a heating furnace, it is elevated by means of a flat vacuum platen which is brought into contact with the upper side of the glass sheet. When the vacuum platen and the glass sheet are raised to an elevated position, the shaping mold is conveyed into a position beneath the glass sheet, the vacuum is released, and the glass sheet drops onto the shaping mold to effect the bending. The shaping mold is then retracted from beneath the vacuum platen and passed into a tempering station where blasts of air are directed onto the opposite surfaces of the glass sheet to temper the glass. This arrangement greatly simplifies change-over from one shape to another since the single bending mold is the only major element which must be reconstructed. Another important feature of the present invention is that the arrangement may be readily adapted to bending and tempering a plurality of glass sheets simultaneously, thereby greatly increasing the productivity of the installation.

In the present invention auxiliary shaping means are employed in conjunction with a flat vacuum platen in order to impart localized curvature to side portions of each glass sheet, while the overall curvature is provided by the force of dropping onto a shaping mold. The flat platen is adapted to engage less than the full area of the glass sheet, leaving at least one side portion of the glass sheet extending beyond the side of the platen. The auxiliary shaping means act upon this extending portion of the glass sheet as the glass is held on the platen so as to pre-shape that portion of the sheet prior to dropping the sheet onto the shaping mold.

The auxiliary shaping means may include a contoured shaping block or blocks alongside the flat platen and aligned to engage the extending portion of the glass sheet. In some embodiments, the auxiliary shaping means may also include lifting means for urging the extending portion of the glass sheet into engagement with the shaping block. If required, the lifting means may also be employed to prevent the extending portion of the glass sheet from drooping as the glass sheet is being lifted by the platen. For producing "V" bends, the auxiliary shaping means may incorporate electrical resistance heaters.

THE DRAWINGS

Frame 11 is a perspective view of another alternate mounting arrangement for the aligning frame in the shaping station.

Figure 12:
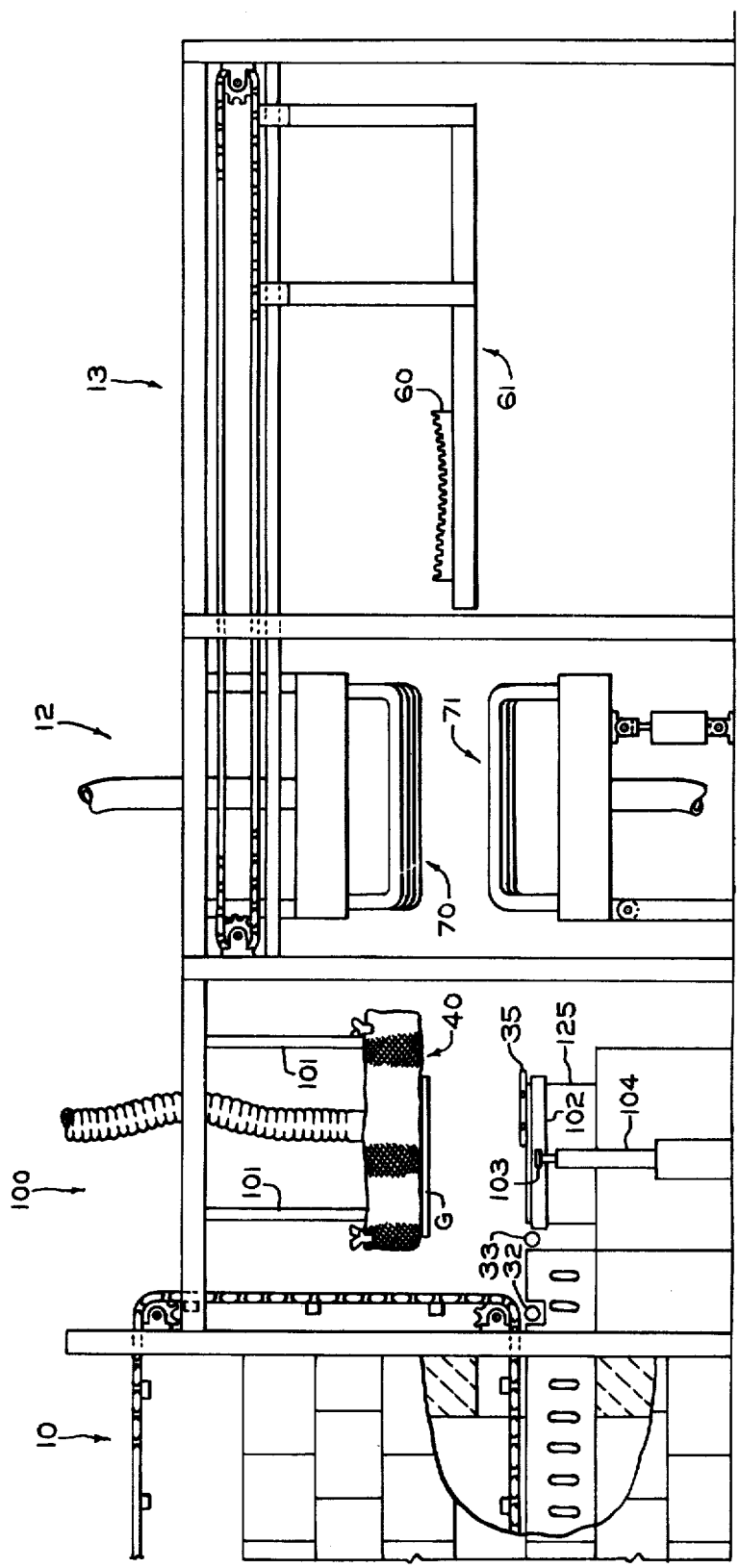

FIG. 12 is a side view of an alternate embodiment for drop forming glass sheets using a flat lifting ring.

FIGS. 13 through 20 and 22 through 28 are schematic end views of a drop forming bending station, looking from the tempering station toward the furnace, incorporating the auxiliary shaping features of the present invention.

Figure 13:
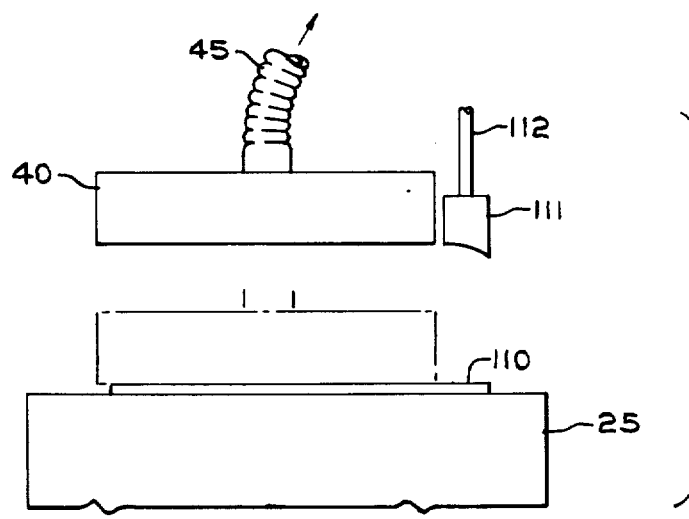
Figure 14:
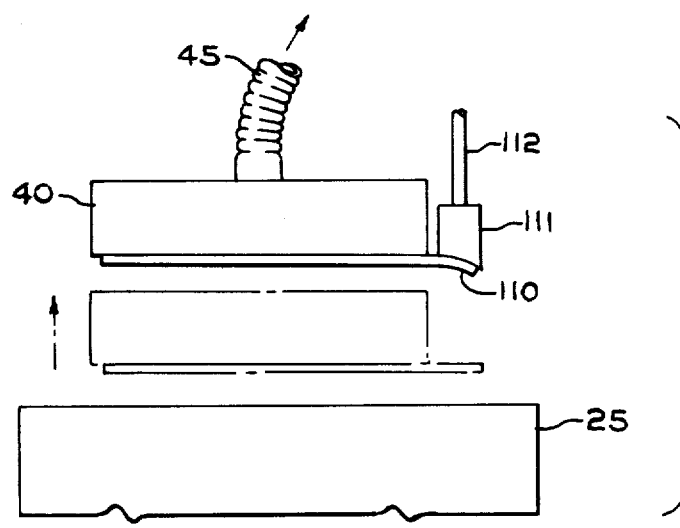
Figure 15:
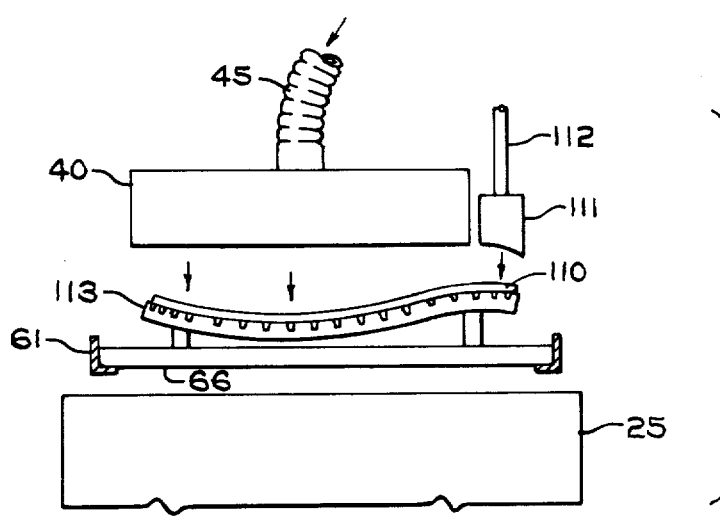
Figure 16:
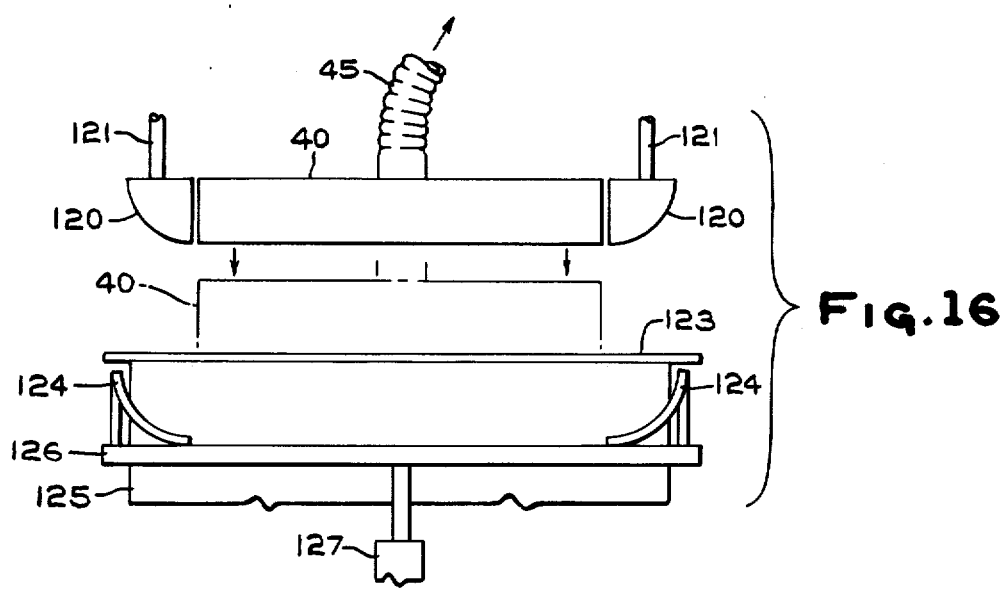

FIGS. 13 through 15 depict a sequence of operation of one embodiment of the invention wherein a stationary shaping block is utilized to yield an "S" curvature in a sheet of glass.

FIGS. 16 through 20 illustrate a sequence of operation of another embodiment of the invention which includes a pair of shaping blocks flanking a vacuum platen and a lifting frame to yield a shaped glass sheet having relatively small radii of curvature at the side portions.

Figure 21:
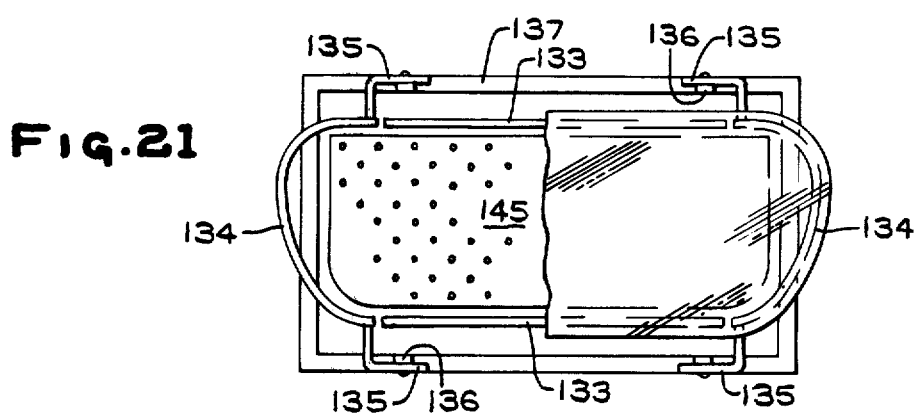
Figure 22:
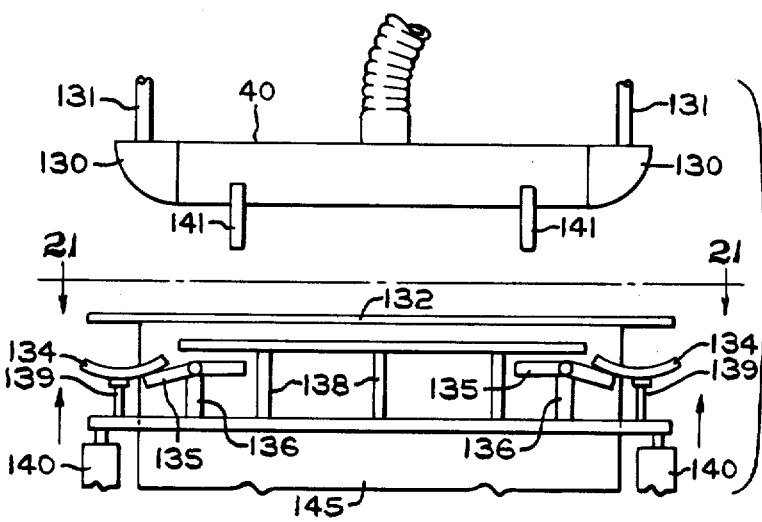
Figure 23:
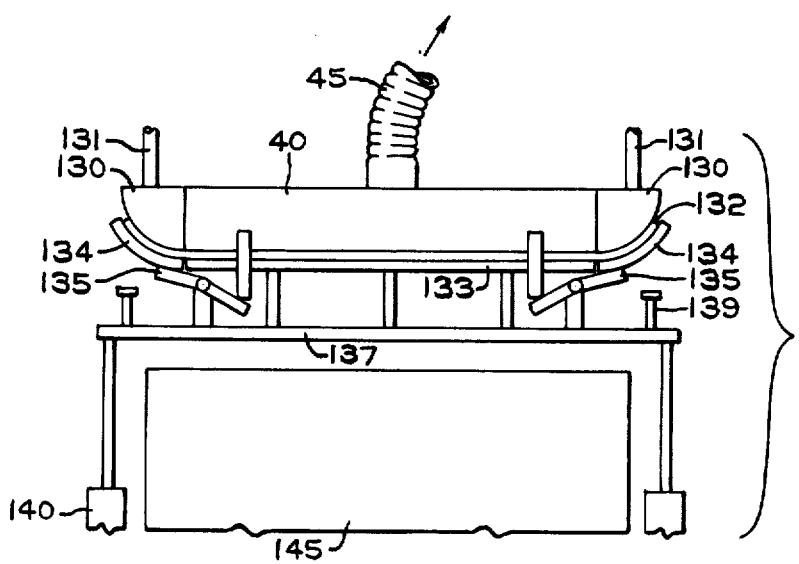
Figure 24:
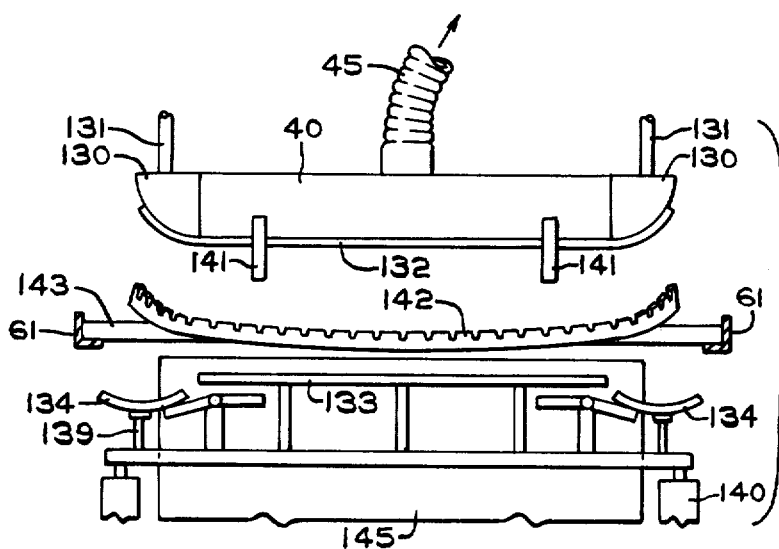

FIG. 21 is a plan view of a gas hearth support block and hinged lifting ring employed in another embodiment of the invention, a sequence of operation of which is depicted in FIGS. 22 through 24.

FIGS. 22 through 24 show a sequence of operation of an embodiment of the invention employing a hinged lifting ring in conjunction with curved shaping blocks flanking a flat vacuum platen.

Figure 25:
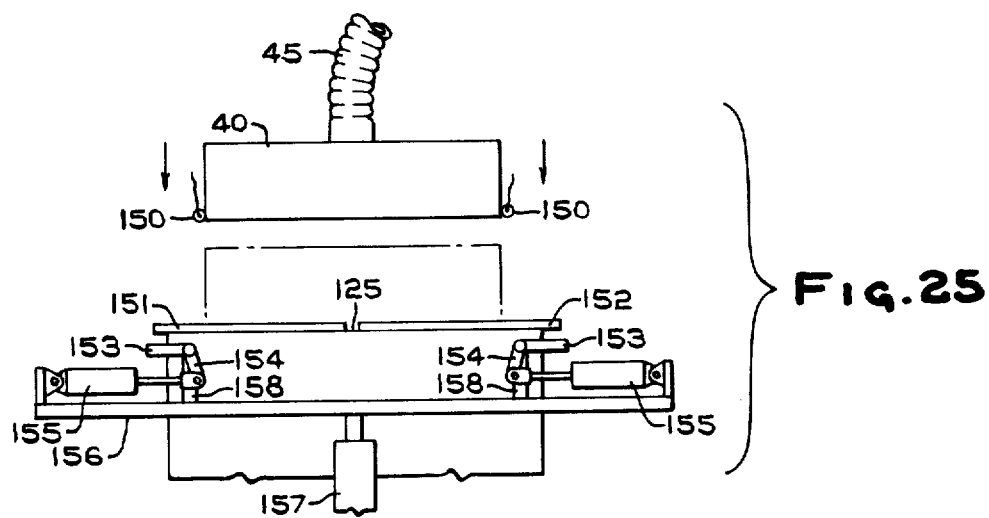
Figure 26:
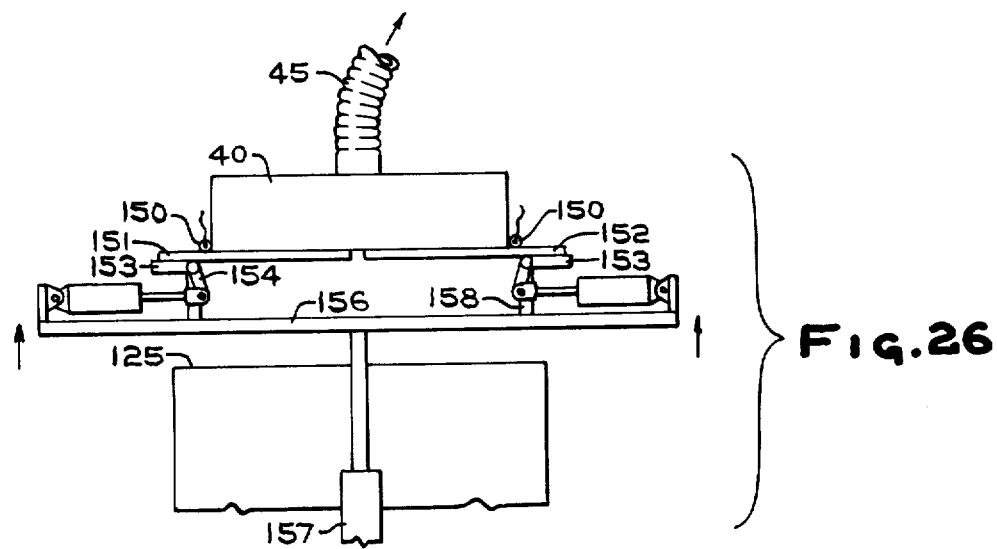
Figure 27:
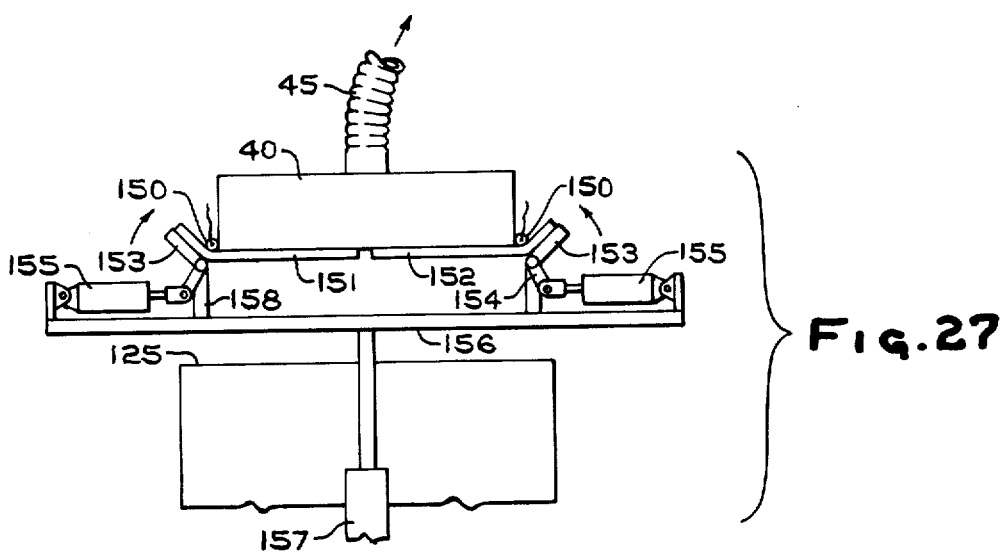

FIGS. 25 through 27 illustrate a sequence of operation for yet another embodiment of the invention wherein electrical resistance line heaters and pneumatically pivoted lifting means are used to produce a pair of "V" bends simultaneously.

DETAILED DESCRIPTION

Figure 1:
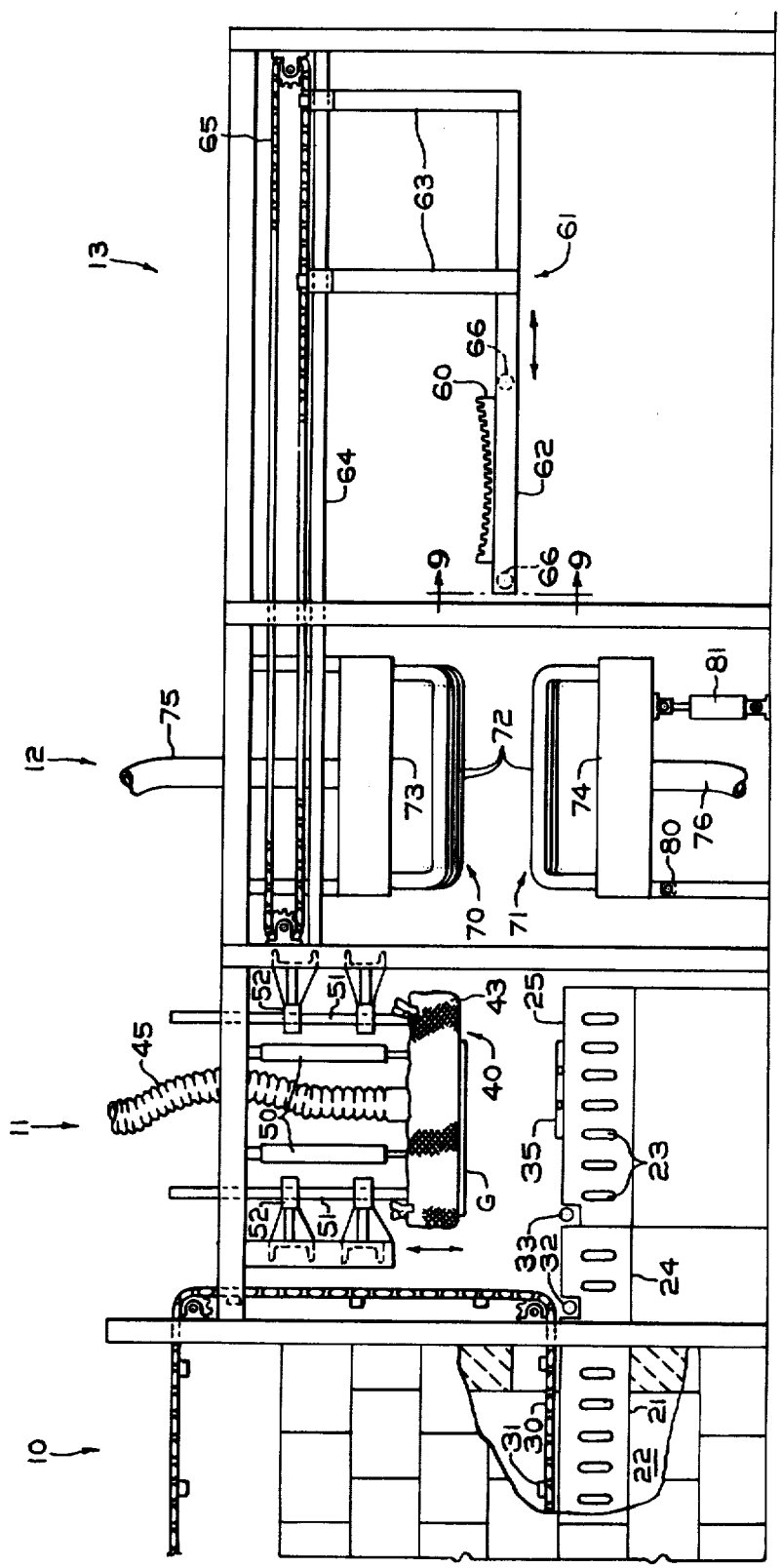
FIG. 1 is a side view of a specific preferred embodiment of a glass sheet bending and tempering installation incorporating the drop forming process and flat vacuum pick-up.

In FIG. 1 there is shown a bending and tempering line including a furnace 10 (only the exit end of which is shown), a bending station 11, a tempering station 12, and an unloading station 13. The furnace, tempering station, and unloading station form no part of the present invention, and the description of a specific embodiment herein is for the purpose of illustration only. Any arrangement known in the art for heating and tempering a series of horizontally disposed glass sheets may be employed in connection with the bending process of the present invention. Accordingly, only a brief description of the furnace, tempering station and unloading station will be set forth here. Additional details regarding these aspects of the overall bending and tempering line may be obtained from U.S. Pat. No. 3,846,104 (Seymour), the disclosure of which is hereby incorporated by reference.

Furnace 10 is preferably of the gas support type wherein the sheets of glass are supported on a layer of hot gases as they are heated and conveyed through the furnace. Examples of gas support furnaces for heating glass sheets may be found in U.S. Pat. No. 3,223,501 to Fredley et al. and in U.S. Pat. No. 3,332,759 to McMaster et al. In the cut-away portion of the furnace in FIG. 1 it can be seen that the gas support bed is defined by a hearth block 21 through which a large number of vertical bores extend, some of which communicate the upper surface of the hearth block with hot, pressurized gases from a plenum chamber 22 and others of which communicate the top surface of the hearth block with cross-bored exhaust passages 23. The same hearth block construction continues beyond the furnace exit to an extension 24 and a support block 25 in the bending zone. Greater detail of the hearth block construction may be found in the cross-sectional view of support block 25 in FIG. 3. There, it can be seen that vertical bores 26 extend completely through the block and that bores 27 extend from the surface to the horizontally extending exhaust passages 23.

Referring again now to FIG. 1, there is shown one typical arrangement for propelling the glass sheets through the furnace as they are supported on a film of hot gases. The conveying mechanism there comprises a pair of parallel, endless chains 30 flanking the path of the glass sheets inside the furnace and joined by a plurality of pusher bars 31. At the exit of the furnace, each glass sheet may be released from the chain conveying means and driven at an accelerated speed across the extension block 24 and into the bending station by means of a take-out roll 32 and an aligning roll 33. Passage of the glass sheets from the furnace may be aided by providing the hearth blocks 21, 24, and 25 with a slight downward slope (e.g., 1 degree to 2 degrees). Typically, sufficient gas pressure is maintained between the hearth blocks and the glass sheets so as to float the glass sheets about 1/16 inch (1.6 millimeters) above the upper surface of the hearth blocks. Take-out roll 32 and aligning roll 33 project above the upper surface of the hearth blocks just enough to make contact with the undersides of the glass sheets.

Figure 2:
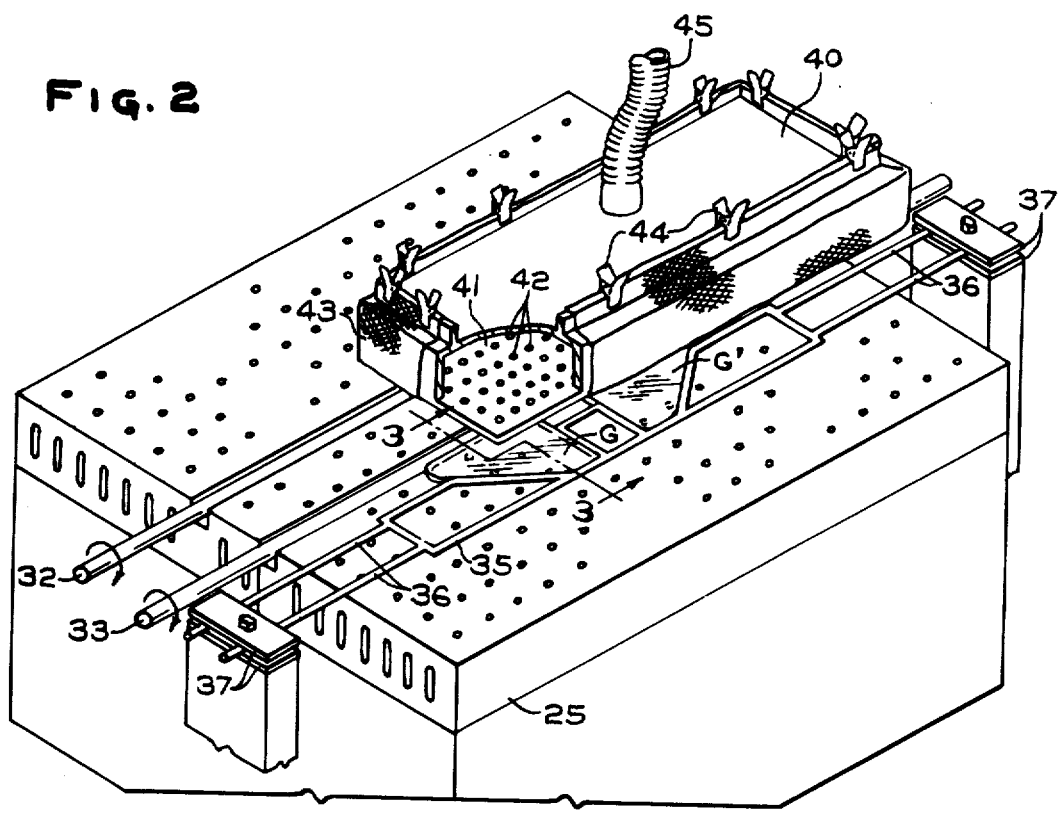
FIG. 2 is a perspective view of the drop forming section of the bending and tempering apparatus of FIG. 1.
Figure 3:
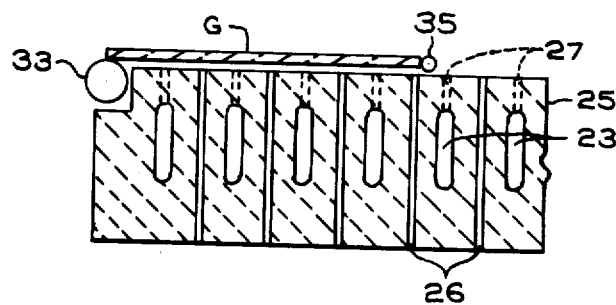
FIG. 3 is a cross-sectional view through the gas support block in the forming zone taken along line 3—3 in FIG. 2.

When a glass sheet has arrived in the bending station, its forward progress is stopped by a locator frame 35 resting on hearth block 25. The locator frame defines at least one open-ended "pocket" within which the forward portion of a glass sheet may be received. As shown in FIG. 2, the locator frame 35 includes two such pockets for receiving glass sheets G and G'. Each of the glass sheet receiving pockets is contoured to correspond approximately to the outline of the leading portion of each glass sheet so that the glass sheet, when urged into engagement with the locator frame, will become seated firmly within the pocket with little or no freedom of movement. The locator frame 35 is spaced from aligning roll 33 a precisely determined distance so that the trailing edge of a properly aligned glass sheet is approximately directly over the center of the aligning roll 33 as shown in FIG. 3. The aligning roll 33 continues rotating so as to urge the glass sheet into the pocket of the aligning frame as the glass sheet floats on the layer of hot gases. The frictional force between the aligning roll 33 and the glass sheet is minimized and restricted to the trailing edge of the glass sheet in order to avoid scuffing the glass, but is sufficient to drive the floating glass sheet into an equilibrium position in alignment with the pocket of the locator frame and to retain the glass sheet therein. Such an aligning arrangement readily lends itself to processing a plurality of glass sheets side by side. For example, the locator frame in FIG. 2 is constructed to receive two glass sheets and in FIG. 10 a locator frame is shown for receiving four glass sheets. It should be apparent that a locator frame could be adapted to accommodate any number of glass sheets which will fit side-by-side on the hearth block 25. The locator frame 35 may be held in place by means of rods 36 which, as shown in FIG. 2, may extend laterally toward support means on each side of the hearth block 25. The rods 36 are preferably supported at their ends with some provision for adjustability, such as by clamping between a pair of plates 37 as shown. Other arrangements for mounting the locator frame will be described later in connection with FIGS. 10 and 11. The locator frame arrangement itself is the subject matter of co-pending patent application Ser. No. 960,403 filed on Nov. 13, 1978, by S. L. Seymour and entitled "Glass Sheet Alignment Means and Method," the disclosure of which is incorporated by reference.

While the use of a locator frame and an aligning roll as described above is the preferred arrangement for repetitively establishing a precisely predetermined location for each glass sheet as it enters the bending station, other arrangements may serve the same purpose. For example, the use of vertically retractable pins as shown in U.S. Pat. Nos. 3,573,889 and 3,676,098 may be resorted to. It may also be noted that in the event that a roller conveyor were to be used instead of a gas support bed, the need to precisely align the glass sheets within the bending station may be less critical. This is because glass sheets are more prone to drift out of alignment when floating freely on gas support. When a roller conveyor is used to convey the glass sheets into the bending station, final orientation of the glass sheets may be carried upstream from the bending station as shown in U.S. Pat. No. 3,701,643 to R. G. Frank, for example.

Directly overlying the locator frame 35 is vacuum platen 40. The vacuum platen is comprised of a hollow chamber having a flat bottom plate 41 through which a large number of perforations 42 extend. In order to protect the surface of the hot glass sheets, the underside of the vacuum platen may be covered with a protective cover 43, which may be a stretchable knit fiber glass fabric as disclosed in U.S. Pat. No. 3,148,968 to J. H. Cypher et al. The cover 43 may be held in place by a plurality of clamps 44. The hollow interior of the vacuum platen communicates with a source of vacuum by means of a flexible conduit 45. The area of the vacuum platen should exceed the total area of the largest glass sheet or sheets to be received at one time in the locator frame 35. For the greatest versatility the vacuum platen may cover substantially the entire area of hearth block 25.

The flatness and rigidity of the bottom plate 41 of the vacuum platen are important factors for the successful practice of the present invention. Any significant deviation from flatness can result in distortion being imparted to the glass sheets. Thus, the bottom plate 41 should be fabricated with careful attention to providing a flat bottom surface and should be sufficiently rigid to avoid any bending or warping during use. Preferably, the bottom plate is a relatively thick, single piece of heat-resistant metal, such as stainless steel, although in some cases it may be possible to use thinner stock material with reinforcement members welded to the interior surface. As an example of the preferred one-piece construction, a stainless steel thickness of at least one-half inch (13 millimeters), preferably at least ⅝ inch (16 millimeters), has been found suitable for a plate 32 inches by 78 inches (81 centimeters by 2 meters). In that example, the interior of the vacuum platen was 3 inches (7.5 centimeters) tall.

The vacuum platen is provided with means for vertical reciprocation, such as hydraulic cylinders 50 and guide rods 51, as shown in FIG. 1. The guide rods 51 may slide in fixed, annular sleeves 52. The cylinders 50 reciprocate the vacuum platen between a raised position, as shown in FIG. 1, and a lowered position in which the platen is brought closely adjacent to, or in contact with, the locator frame 35 and the glass sheet or sheets held by the locator frame. When the vacuum platen is in the lowered position, sufficient vacuum is applied to draw the glass sheets into contact with the platen and to be lifted by the vacuum platen as the vacuum platen is raised. The platen need not come into contact with the glass sheets in order to pick them up. Merely approaching within 1/32 inch (0.8 millimeter) to about 1/16 inch (1.6 millimeters) has been found sufficient to lift the glass sheets, although this may vary depending upon the amount of vacuum applied and the weight of the glass. Additionally, the amount of vacuum required, the number of perforations 42 in the vacuum platen, and the diameter of the perforations are interdependent. It is desirable to keep the perforations 42 small in number and diameter so as to minimize the power requirement for maintaining a vacuum in the vacuum platen, but there should be enough perforations so that a relatively uniform distribution of the perforations will overlie each portion of the smallest piece of glass to be processed. A spacing of about one perforation per square inch (6.5 square centimeters) has been found to be suitable for most purposes. Perforation diameters larger than 0.075 inch (1.9 millimeters), for example about 0.090 inch (2.3 millimeters), have been found satisfactory with a vacuum of 4 inches (10 centimeters) water (gauge). These data pertain to the processing of 3 millimeter thick sheets of soda-lime-silica float glass of standard commercial composition.

Figure 9:
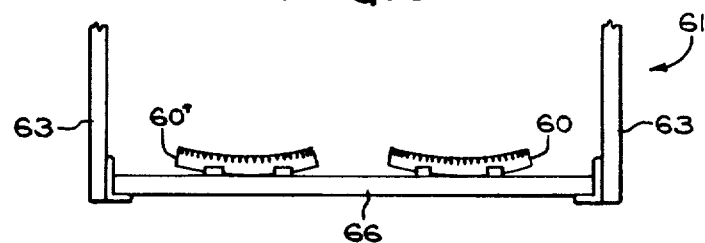
FIG. 9 is an end view of the bending mold and support structure taken along line 9—9 in FIG. 1.

With the glass sheet or sheets drawn against its underside by vacuum, the platen 40 is raised to the elevated position as shown in FIG. 1 so as to leave sufficient clearance to insert an outline shaping mold 60 between the hearth block 25 and the platen. The shaping mold conforms to the outline and contour desired for the bent glass sheets and is preferably constructed in accordance with the disclosure of U.S. Pat. No. 3,973,943 to S. L. Seymour, the disclosure of which is hereby incorporated by reference. The shaping mold is preferably of the outline ring type, light in weight and notched along its upper edge in order to provide minimal interference with the flow of air during tempering. The shaping mold is carried on a shuttle 61 by which the shaping mold is translated horizontally through the bending, tempering and unloading zones. In the specific embodiment illustrated, the shuttle consists of a pair of cantilevered beams 62 supported at one end by vertical braces 63, the upper ends of which are adapted to slide along a pair of horizontal guide rods 64. The means for driving the shuttle 61 along the horizontal path may be provided by way of an electric motor (not shown) driving a continuous chain 65 to which the upper ends of braces 63 are affixed. Cross-braces 66 may support the shaping mold or molds on the shuttle. An end view of the shuttle may be seen in FIG. 9, wherein two shaping molds 60 and 60' are included for simultaneously receiving sheets G and G' in FIG. 2.

When the vacuum platen 40 has been raised to a height above the elevation of the shaping mold 60, the shuttle is driven to the left as viewed in FIG. 1 so as to bring the bending mold into direct alignment beneath the sheet of glass elevated on the vacuum platen. Typically, the distance between the vacuum platen and the hearth block 25 at this point may be about 6 to 8 inches (15 to 20 centimeters). This distance will have an effect on the rate at which the glass sheet loses heat, since a higher elevation raises the glass sheet into a cooler environment. This effect may be used to "fine tune" the temperature (and thus the viscosity) at the moment the glass sheet is dropped onto the shaping mold. The uppermost extent of the shaping mold when in position directly beneath the glass sheet is spaced from the glass sheet a distance greater than the minimum required to clear the glass sheet, so that when the glass sheet is released from the vacuum platen it will fall a distance onto the shaping mold sufficient to generate a substantial bending force on the glass upon impact. In the typical case where the contour of the shaping mold includes points of maximum elevation, the falling glass sheet first contacts these high points, and a bending moment about these points is generated which forces the remainder of the glass sheet to bend downwardly until substantially complete contact is made with the shaping mold. A suitable distance between the vacuum platen and the high points of the shaping mold has been found to be about 1 to 2 inches (2.5 to 5 centimeters), and about 2 to 6 inches (5 to 15 centimeters) at the low points of the mold. The precise distance through which the glass falls will depend upon the weight and temperature of the glass, the degree of curvature to be imparted to the glass, and the geometry of the particular shape, and in unusual cases may vary beyond the distance ranges given above.

Release of the glass sheet from the vacuum platen is carried out by reducing the vacuum to an amount insufficient to support the glass sheet. This may be accomplished conveniently by opening a valve to bring the interior of the vacuum platen into communication with atmospheric pressure. Or in some cases, it may be desirable to expedite the release of the glass from the platen by following a rapid decay of the vacuum with a rapid buildup to a positive pressure. Another optional feature is to provide the vacuum platen with a plurality of separately controllable vacuum zones so that the vacuum may be released nonuniformly. For example, it may be beneficial in some cases to release the edge portions and the center portion of a glass sheet at different times. By delaying the release of the center portions a slight reverse bend may be imparted to the glass, which may be helpful in avoiding excessive center sag when the glass sheet is dropped onto a concavely contoured outline shaping mold. Conversely, differential vacuum release may be utilized to accentuate a relatively deep bend which may be otherwise difficult to attain by impact force alone.

The momentum imparted to the glass sheet by its free fall onto the shaping mold preferably provides essentially the sole bending force for conforming the glass sheet to the contour of the shaping mold. Although some minor amount of sagging due to the force of gravity may take place after the glass sheet has come to rest on the shaping mold, its magnitude is insignificant relative to the bending produced by the momentum-generated force in the preferred mode of operation. Sagging is a relatively slow process, and in the present invention, tempering is preferably initiated in the minimum amount of time, thereby providing insufficient time for a significant amount of gravity-induced sagging to take place. On the other hand, for some difficult bends it may be desirable to delay the start of tempering so as to permit a significant amount of additional sagging to take place after the glass sheet has dropped onto the mold. Although slower than the preferred mode, such a technique would be considerably faster than gravity sagging alone since the initial dropping of the glass onto the mold would accomplish a substantial part of the bending very quickly.

Upon receiving the glass sheet, the shaping mold is immediately transferred out of the bending station into the tempering station 12. The tempering station includes upper and lower blast heads 70 and 71 which direct blasts of tempering medium (usually air) onto opposite sides of the glass sheet so as to rapidly cool surface portions of each glass sheet, thereby imparting a temper to the glass sheet. In the type of tempering station shown in FIG. 1, each blast head includes a plurality of pipe modules 72 in fluid communication at their ends with a manifold 73 or 74. Each manifold, in turn, is supplied with pressurized tempering fluid through ducts 75 and 76. Each of the pipe modules 72 has a plurality of small orifices oriented so as to direct jets of tempering fluid toward the position occupied by glass sheets conveyed into the space between the upper and lower blast heads 70 and 71. The pipe modules 72 may be provided with adjustability in the vertical direction with respect to the manifolds 73 and 74 so that more uniform spacing between the glass surfaces and the pipe modules may be provided. The lower blast head 71 may be provided with hinged support 81 at one end and cylinder means 81 at the opposite end so as to permit the lower quench module to be tilted when the need arises to clear glass fragments from the blast head. While blasts of tempering medium are being directed onto the glass sheets in the tempering station, it is preferred to provide relative motion between the blast heads and the glass sheets. This may be carried out by horizontally reciprocating the shuttle means 61 on which the shaping mold and glass sheets are carried.

When tempering has been completed, the shuttle means 61 advances to the full right-hand position as shown in FIG. 1 to bring the glass sheet or sheets into the unloading station 13. There, the glass sheets may be removed from the shaping mold by hand or by suitable mechanical means.

Figure 4:
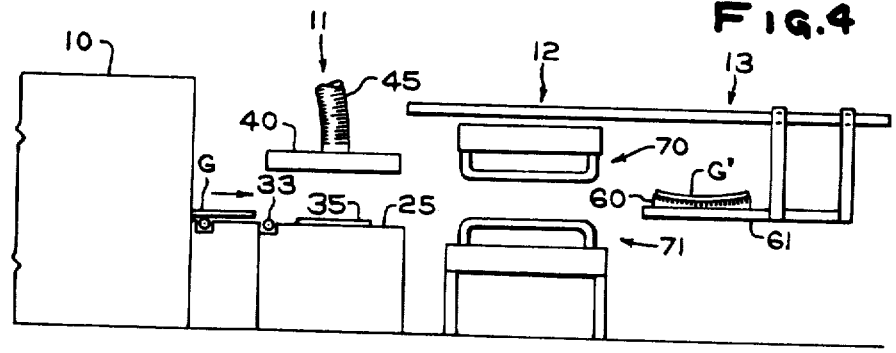
FIGS. 4 through 8 illustrate sequential steps in a cycle of operation of the apparatus of FIG. 1.
Figure 5:
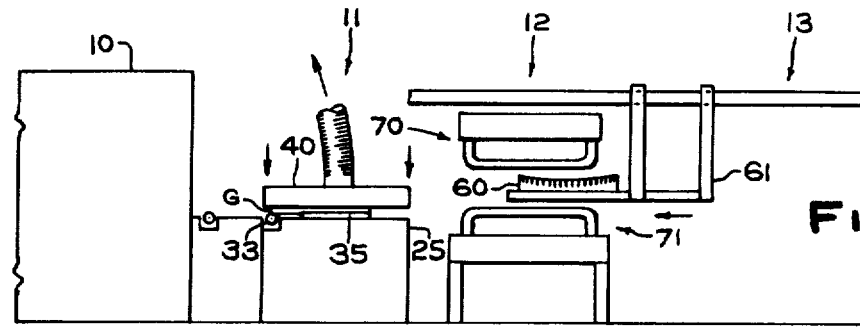
Figure 6:
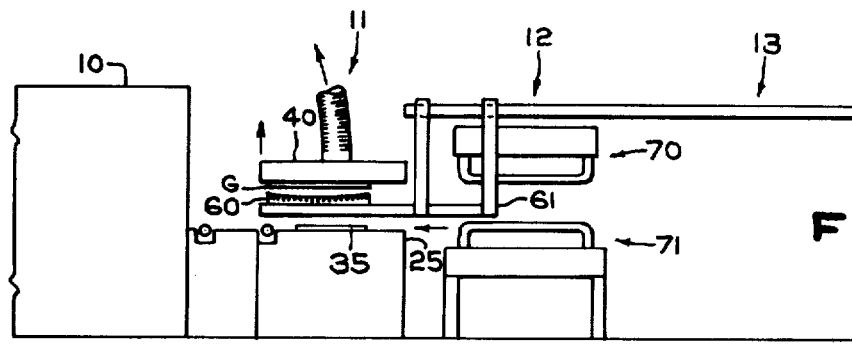
Figure 7:
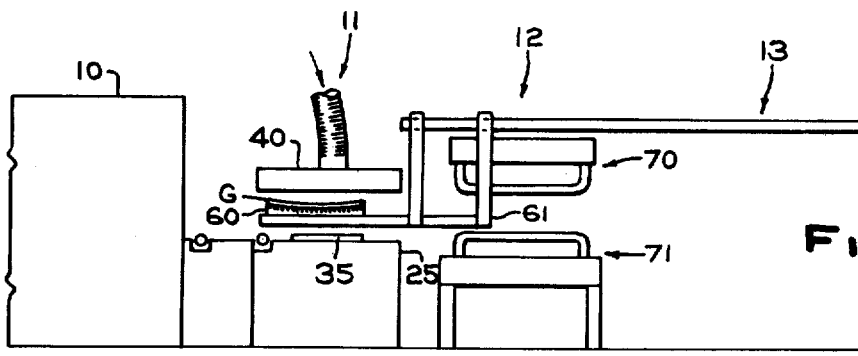
Figure 8:
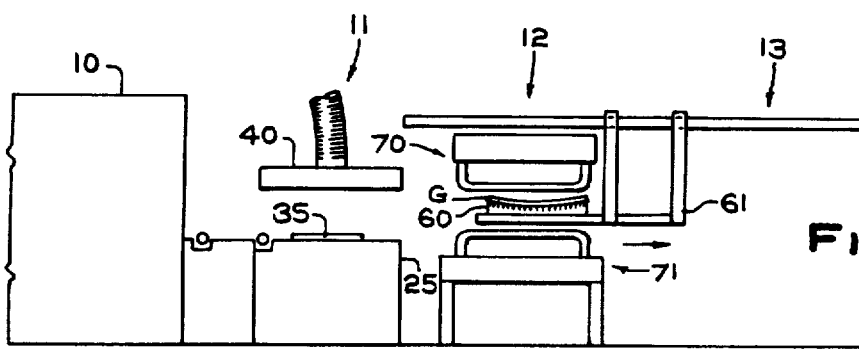

FIGS. 4 through 8 illustrate one cycle of operation in the method of bending glass sheets in accordance with the present invention. In FIG. 4, a sheet of glass G is emerging from the furnace 10. At the same time, an already bent and tempered sheet of glass G' is about to be unloaded from the shuttle 61. In FIG. 5, the sheet of glass G has entered the bending station 11 and its front end has engaged the locator frame 35 while being driven at its trailing edge by aligning roll 33. At the same time, vacuum platen 40 is being lowered to engage the glass sheet. The previous glass sheet has been unloaded from the shuttle 61 and the shuttle has begun to move toward the bending zone. In FIG. 6, the sheet of glass has been lifted from the gas support bed 25 by the vacuum platen 40 and shuttle 61 has come to rest, with the shaping mold 60 directly beneath the glass sheet. In FIG. 7, the vacuum has been released from the vacuum platen and the sheet of glass has fallen onto the shaping mold 60 and has thereby become bent to the desired curvature. The shuttle immediately carries the glass sheet out of the bending station and into the tempering station 12 where it is rapidly cooled by blasts of air as shown in FIG. 8. Thereafter, the shuttle carries the glass sheet into the unloading station 13.

The following operating parameters are an example of a successful operation of the above-described preferred embodiment of the invention with glass sheets 3 millimeters thick. Under different conditions the data will vary. The furnace atmosphere was maintained at a temperature of about 1300° F. (700° C.). The gas issuing from the hearth block 25 in the bending zone may be about 1100° to 1350° F. (600° C. to 725° C.), typically about 1250° F. (675° C.). The vacuum platen 40 attained a temperature of about 500° to 750° F. (260° to 400° C.) after a period of operation due to its proximity to the hot gases from hearth block 25. The glass was typically at about 1210° F. (650° C.) when picked up by the vacuum platen. A total of about 6 seconds elapsed from the time of glass pick-up until the initiation of tempering, at which time the glass had cooled to about 1190° F. (640° C.). About 3 seconds elapsed from the time the glass was dropped onto the shaping mold until tempering was initiated. Altogether about 10 seconds was required for the glass to pass from the furnace exit, undergo bending, and enter the tempering station. These rapid bending rates not only indicate a high rate of throughput, but are also advantageous for the sake of attaining high degrees of temper since the rapidity of the bending process permits tempering to begin before the glass sheets have lost an appreciable amount of heat.

Figure 10:
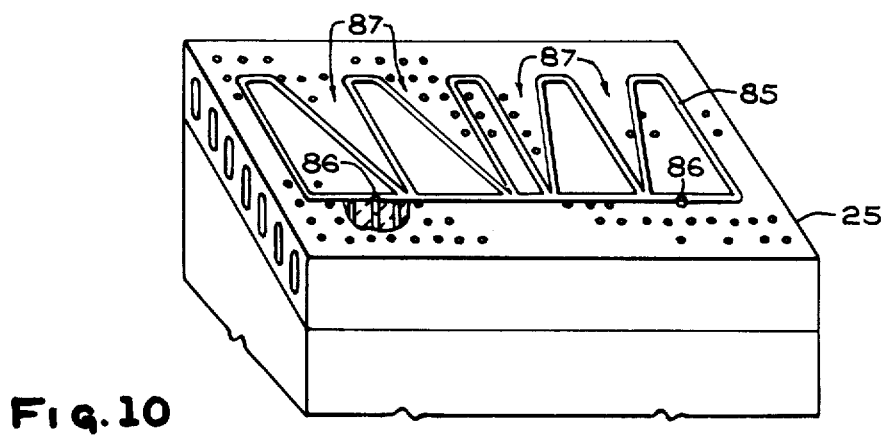
FIG. 10 is a perspective view of the gas support bed in the shaping station showing a quadruple aligning frame and an alternate mounting arrangement for the aligning frame.

FIG. 10 shows an alternate arrangement for mounting a locator frame onto the hearth block 25 in the bending station. In order to illustrate the versatility of the locator frame arrangement, a locator frame 85 is depicted in FIG. 10 which is provided with four pockets 87 permitting the simultaneous alignment and bending of four sheets of glass. For retaining the locator frame in place, two or more pins 86 are welded to the front edge of the locator frame and may be inserted into holes bored into the hearth block 25. The holes may be those already present in the hearth block for the passage of gases, or special holes may be drilled for the purpose of receiving the pins 86.

Figure 11:
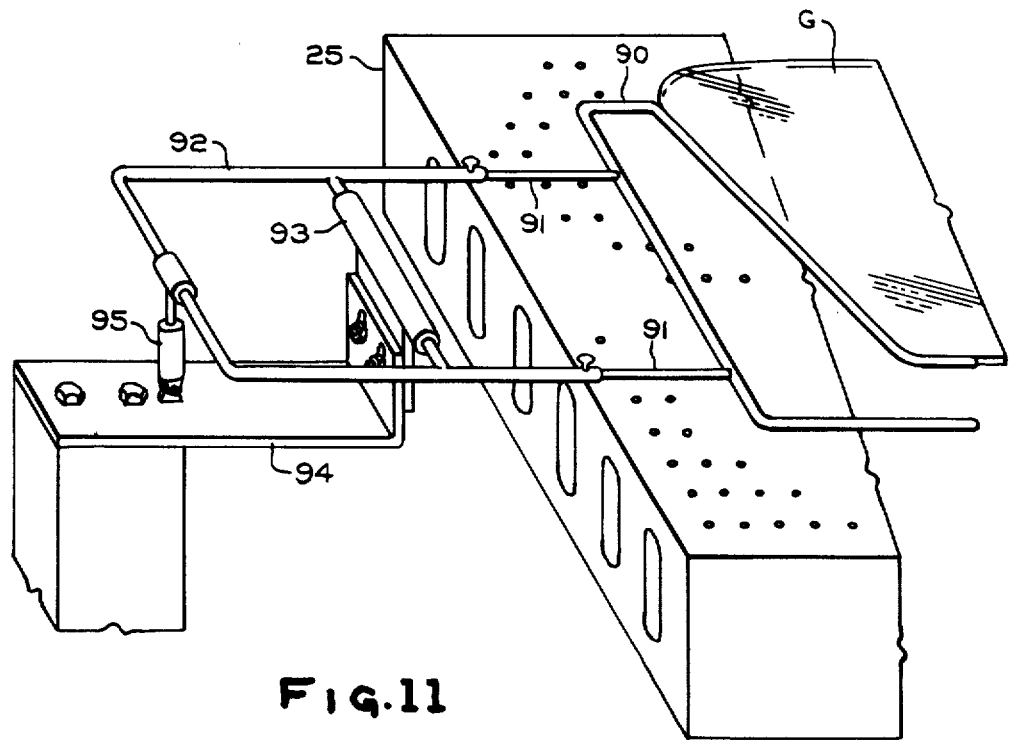

FIG. 11 depicts yet another variation on the mounting arrangement for the locator frame. In this case, the locator frame is provided with pivoting support so that the locator frame may be readily raised above the surface of the hearth block 25 if it should become necessary to remove glass fragments from the hearth block. A pair of rods 91 telescope into the ends of a tubular hinge bracket 92 for lateral adjustability. The hinge bracket 92 pivots through a sleeve 93 which is affixed with vertical adjustability to a support arm 94. The outer end of hinge bracket 92 may be engaged by mechanical actuating means such as a hydraulic cylinder 95 so as to provide remote control of the locator frame lifting mechanism. In the embodiment of FIG. 11, it is preferred that the locator frame consist of two halves, with each half being lifted by its own respective hinge means.

FIG. 12 shows an alternate arrangement which incorporates some, but not all, of the features and advantages of the preferred embodiment of the present invention. In FIG. 12, like numerals refer to elements which may be identical to those which have been described in connection with the preferred embodiment of FIG. 1. In particular, the furnace 10, tempering station 12, and unloading station 13 are identical to those of FIG. 1 and need not be described here. However, in the bending station 100 in FIG. 12, the vacuum platen 40 is not vertically reciprocated but is rigidly suspended by beams 101. Like the preferred embodiment, the vacuum platen is flat and need not be modified when changing glass shapes. But instead of being picked up by the vacuum platen, the glass sheets in this embodiment are lifted into contact with the underside of the vacuum platen by a lifting ring 102. Lifting ring 102 is vertically reciprocated by means of a hydraulic cylinder 104 which is connected to the ring by means of a laterally extending tab 103. The ring 102 may fit around a gas support hearth block 125 which may be of essentially the same construction as that of previously described hearth block 25, but of reduced size. Alternatively, the ring 102 may fit into grooves cut into the top of a larger size hearth block. The upper side of the lifting ring defines a flat plane of support for a glass sheet along either a continuous or discontinuous line of contact with marginal edge portions of a glass sheet. Glass sheets are aligned on hearth block 125 by a locator frame 35 and aligning roll 33 in the same manner as previously described. After each glass sheet is lifted by the ring 102 and retained on the underside of the vacuum platen 40, the ring is retracted to its lower position, a shaping mold 60 is brought into alignment beneath a each glass sheet, and the glass sheet is dropped onto the shaping mold to impart the desired curvature to the glass sheet. This arrangement is advantageous relative to prior art vacuum assisted bending arrangements in that the vacuum platen is flat and need not be reconstructed when a product change is made, and in that it can be readily adapted to the simultaneous processing of a plurality of glass sheets. However, the FIG. 12 arrangement is not as advantageous as that of the preferred embodiment because the hearth block 125 and the lifting ring 102 must be replaced for each change in the shape or number of glass sheets to be processed.

Other variations on the FIG. 1 embodiment which are contemplated by the present invention may involve the use of a roller conveyor instead of the gas support means for supporting and conveying the glass sheets. A roller conveyor may be used in place of all of the gas support bed sections in the furnace and bending station, or it may be advantageous to substitute a roller conveyor for the gas support bed in the furnace only and to utilize a gas support hearth block such as 25 in the bending station.

It should also be apparent that the step of aligning the shaping mold with the glass sheet prior to dropping the glass sheet may optionally entail translating the platen rather than the shaping mold.

Another alternative within the scope of the invention is to heat the glass sheets as they are being supported in a generally vertical orientation. For example, the glass sheets may be conveyed through a furnace while resting on their lower edges and being held upright by currents of heated gases, as disclosed in U.S. Pat. No. 3,341,312 to R. W. Wheeler. The vacuum platen may swivel to receive each glass sheet in a vertical orientation and then rotate to a horizontal orientation for dropping the glass sheet onto a shaping mold.

FIGS. 13 through 28 relate to the auxiliary shaping features of the present invention. Each of these figures is an end view of a bending station including a flat vacuum platen 40 and a gas support hearth block 25 or 125 as described hereinabove in connection with the previous embodiments.

In FIGS. 13 through 15 there is shown an embodiment adapted to produce S-shaped bends in glass sheets. In addition to the hearth block 25 and flat vacuum platen 40 as previously described, there is provided auxiliary shaping means comprising a stationary shaping block 111. The shaping block 111 may be a solid molded block of ceramic or other suitable heat-resistant material or it may be hollow and provided with orifices on its lower face through which vacuum may be drawn. Alternatively, the shaping block 111 may be constructed similarly to the platen 40, that is, a metal enclosure having a perforated bottom plate and covered with a fiber glass fabric. The shaping block 111 may be supported rigidly on a pipe 112 which may also serve to communicate the interior of the shaping block with a source of vacuum, if desired. A sheet of glass 110 resting on the hearth block 25 is brought to rest in a location where the majority of its area underlies the platen 40 and a side portion of the area extends beyond the vacuum platen and is aligned beneath the shaping block 111. In order to produce S-shaped bends, the glass facing surface of the shaping block 111 is provided with a concave curvature. In FIG. 13, a sheet of glass 110 has come to rest on the hearth block and the platen 40 is in the upper retracted position initially and then, as shown in phantom lines, is lowered to engage the glass sheet and to lift it by means of vacuum. In FIG. 14, the sheet of glass is shown in phantom lines being lifted by the platen with a side portion of the glass sheet extending beyond the platen. When the platen returns to its upper retracted position, the extending portion of the glass sheet is engaged by the curved underside of the shaping block 111. Optionally, formation of the curvature in the extending portion of the glass sheet may be assisted by vacuum drawn through the shaping block 111. In the final bending step illustrated in FIG. 15, a shaping mold 113, which may be of the outline ring-type previously described, has been conveyed into alignment beneath the glass sheet held on the platen by means of the shuttle 61 as in the previous embodiments. Release of the vacuum from the platen results in the glass sheet dropping onto the shaping mold as shown in FIG. 15 whereupon the impact of the fall causes the glass sheet to bend to a curvature defined by the shaping mold. The glass sheet may then be conveyed by the shuttle means into a tempering station.

Figure 17:
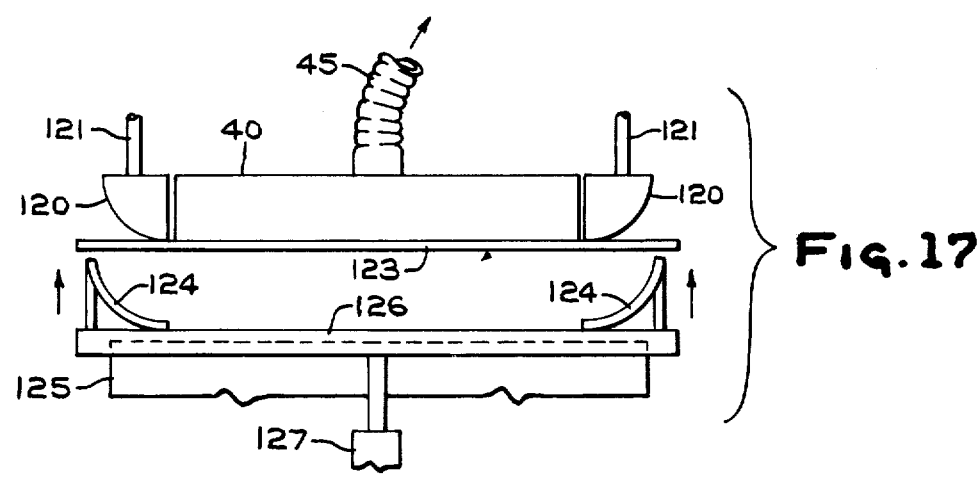
Figure 18:
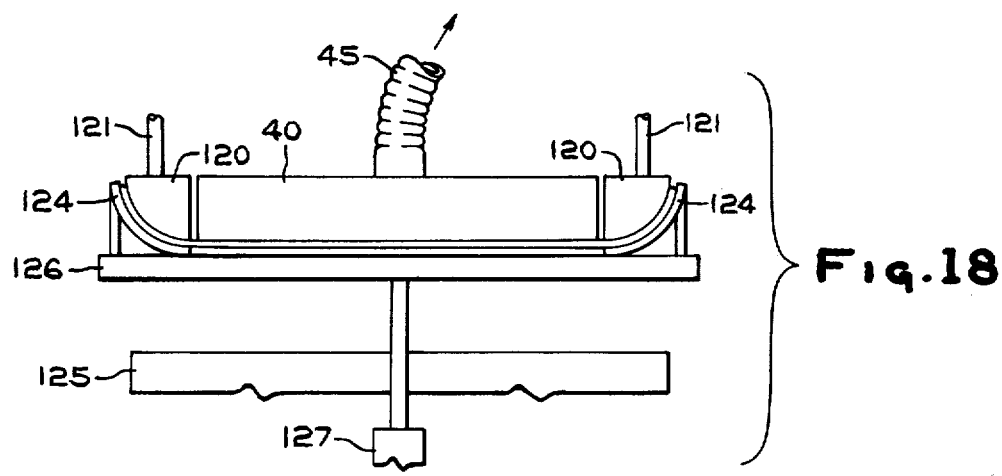
Figure 19:
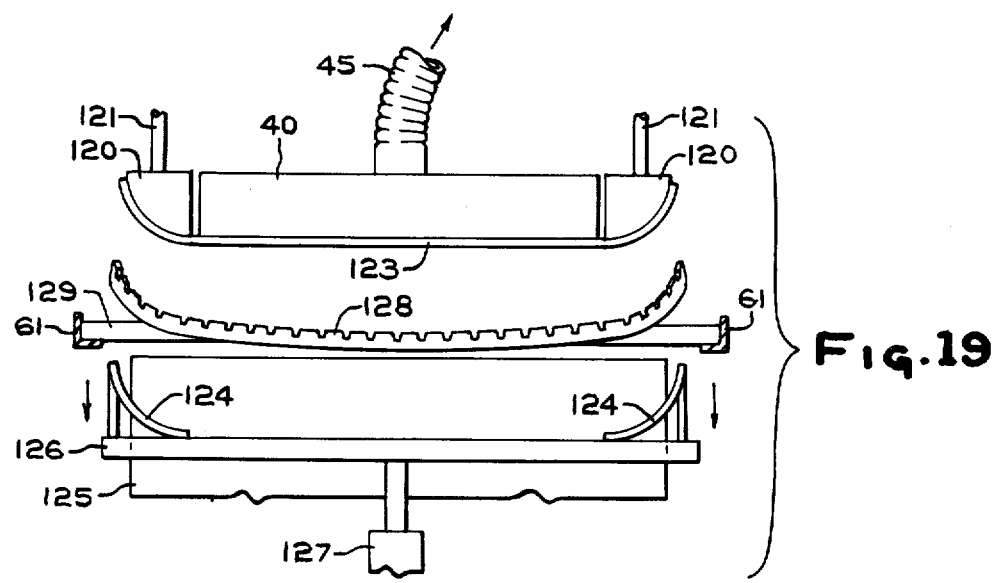
Figure 20:
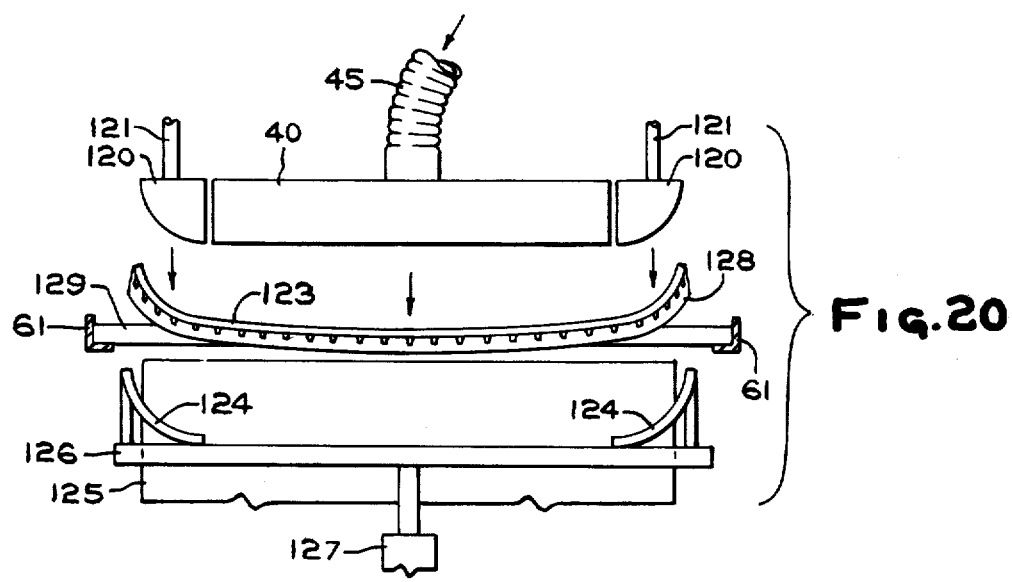

FIGS. 16 through 20 illustrate another embodiment for drop forming glass sheets with auxiliary shaping means wherein the platen 40 may be flanked by a pair of curved shaping blocks 120. The shaping blocks 120 are provided with stationary support and may be provided with vacuum by means of conduits 121. A sheet of glass 123 supported on the gas support hearth block 125 extends beyond both sides of the platen 40 so as to underlie the shaping blocks 120. As shown in phantom lines in FIG. 16, the flat platen 40 may be vertically lowered to engage and lift the sheet 123 by means of vacuum. As the platen raises the glass sheet, a lifting frame 126 having curved shaping rails 124 on opposite sides and extending around the hearth block 125 is raised from its retracted position shown in FIG. 16 where the shaping rails are below the upper surface of the hearth block to follow the glass sheet as it is lifted, as shown in FIG. 17. Raising of the lifting frame 126 may be carried out by a cylinder 127. In order to prevent or minimize drooping of the extending portions of the glass sheet as it is being raised, the lifting frame 126 may rise at a rate to maintain the shaping rails in close proximity to or in light contact with the underside of the glass sheet. When the platen reaches its uppermost position as shown in FIG. 18, the lifting frame continues to move upwardly so that the shaping rails 124 bring the extending portions of the glass sheet into close proximity to the curved shaping surfaces of the shaping blocks 120. Preferably, vacuum is drawn through the shaping blocks so as to maintain the adjacent portions of the glass sheet in contact therewith as the lifting frame 126 is lowered to its original retracted position around the hearth block. In FIG. 19, the lifting frame 126 is shown in its retracted position and the shuttle 61 has conveyed a shaping mold 128 into position beneath the glass sheet. Arms 129 may support the shaping mold 128 on the shuttle 61. Releasing the vacuum from the platen 40 and the shaping blocks 120 results in the glass sheet being dropped onto the shaping mold 128 as shown in FIG. 20 whereupon the central portion of the glass sheet is bent and the relatively deep bend in the side portions of the glass sheet is retained or further deepened. The bent glass sheet is then conveyed from the bending station by the shuttle 61.

Another embodiment of the invention involving the use of a lifting frame having hinged shaping rails is illustrated in FIGS. 21 through 24. In FIG. 21, which is a top view along line 21—21 in FIG. 22, there may be seen a sheet of glass 132 brought to rest on a gas support hearth block 145, which may be essentially the same as hearth block 125 shown in FIG. 12 but provided with a specially adapted outline. Referring to FIGS. 21 and 22, it may be seen that the flat platen 40 is flanked by a pair of curved vacuum mold sections 130 communicating with a source of vacuum by way of conduits 131. The glass sheet 132 extends beyond the sides of the hearth block 145 so that the edge of each extending portion aligns with a respective curved shaping rail 134. Each shaping rail 134 is carried on a pivot arm 135, each of which is pivotably mounted on a post 136 which in turn is carried on a lifting frame 137. A flat lifting rail 133 may also be carried on the lifting frame by way of legs 138. Stops 139 hold the hinged shaping rail sections 134 in an open position with their upper extremities slightly below the surface of the hearth block as shown in FIG. 22. Downwardly extending fingers 141 carried on the vacuum platen are aligned to engage the opposite ends of the pivot arms 135 from the shaping rails 134. Thus, when the lifting frame and the vacuum platen are brought together, the fingers 141 force the shaping rails 134 to pivot upwardly to press the extending portions of the glass sheet into close proximity to the curved vacuum mold sections 130. Two modes of operation are possible with this embodiment. As depicted in FIG. 23, one mode of operation entails lifting the glass sheet from the hearth block and into engagement with the platen and shaping mold sections 130 by raising the lifting frame 137. In that case, the platen 40 and the shaping mold sections 130 may be maintained stationary. Alternatively, the platen 40 together with the shaping mold sections 130 may be vertically reciprocated to engage and lift the glass sheet. In this mode of operation, the lifting frame may remain stationary and the flat lifting rails 133 may be eliminated. In either mode of operation, the glass sheet is brought into the elevated position shown in FIG. 24 while shuttle 61 brings a shaping mold 142 into alignment beneath the glass sheet. The shaping mold 142 may be carried on the shuttle 61 by means of support arms 143. Thereafter, as in the previous embodiments, the glass sheet may be dropped onto the shaping mold 142 in order to complete the bending of the glass sheet.

Figure 28:
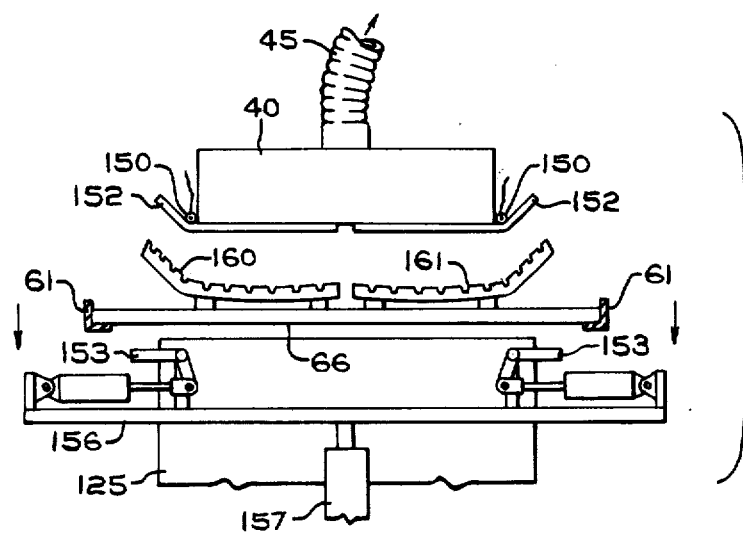

Another variation of the auxiliary shaping means of the present invention is shown in FIGS. 25 through 28 wherein a electric resistance heater element is employed to concentrate a line of heating in a glass sheet and pivoted lifting means are employed to impart a "V" bend in conjunction with drop forming glass sheets. In FIG. 25 there is shown a pair of electric resistance heater elements 150 mounted along the sides of the vacuum platen 40 at an elevation to come into close proximity to or contact the upper surface of a glass sheet retained on the platen. The electric resistance heater means for producing concentrated heat in glass sheets are well-known in the art and may include Nichrome wires, ribbons, or coils, tube heaters having resistance heating coils sheathed in ceramic tubes, or infrared radiation line heaters. The processing of two sheets of glass 151 and 152 in tandem is shown. Each sheet of glass has a side portion extending over the side of the hearth block 125. A pivoted lifting rail 153 is located slightly below each overhanging portion of each glass sheet. A pivot arm 154 is affixed to each lifting rail 153 and pivotably mounted at one end to a post 158 and at the opposite end to the shaft of a cylinder 155. The cylinders 155 and the posts 158 are carried on a lifting frame 156 which may be provided with vertical reciprocation by cylinder means 157. In operation, the flat platen 40 may be lowered as shown in phantom in FIG. 25 to engage both glass sheets and to lift them to the positions shown in FIG. 26. As the glass sheets are lifted on the platen, the lifting frame 156 also rises to the elevation shown in FIG. 26. As the glass sheets are being raised, the lifting frame may rise at the same rate so as to maintain the lifting rails 153 in close proximity to the undersides of the extending portions of the glass sheets so as to prevent dropping thereof. The lifting rails 153 are maintained in the level position shown in FIG. 26 for a brief period while concentrated heat is imparted to the line of sharp bending by the heating elements 150. Then, as shown in FIG. 27, the cylinders 155 are actuated so as to pivot the lifting rails 153 upwardly, thereby bending the extending portions of the glass sheets about the line of intensified heating created by the heating elements. The lifting frame 156 may then be retracted to the lowered position around the hearth block 125 and a pair of shaping molds 160 and 161 carried on the shuttle 61 may be conveyed into alignment beneath the glass sheets 151 and 152, as shown in FIG. 28. Releasing the vacuum from the platen causes the glass sheets to then drop onto the shaping molds to attain their final curvature.

A variation on the embodiment of FIG. 25 through 28 may entail the use of a second heating element along each line of intensified heating in order to speed the production of the heated line. This second heating element may be supported adjacent to the underside of a glass sheet so as to heat the line from both sides. The second heating element may, for example, be received in a groove cut into the top surface of the hearth block 125 and may be carried on the lifting frame so as to continue heating the glass sheet as the glass sheet is being raised. Alternatively, the use of such a heating element on the underside of the glass sheet may be used instead of the heating elements carried by the platen 40.

Descriptions of specific embodiments have been set forth herein for the sake of illustrating the best mode and other illustrative examples for practicing applicant's invention, but it should be understood that other variations and modifications as are known to those of skill in the art may be resorted to without departing from the spirit and scope of the invention as set forth in the claims which follow.

I claim:

1. A method of shaping glass sheets comprising the steps of:
   heating a glass sheet to approximately its softening point;
   bringing a major portion of a surface of the glass sheet into close proximity to a flat platen with a portion of the glass sheet extending beyond a side of the platen;
   drawing a vacuum through the platen so as to retain the glass sheet on the platen;
   engaging the extending portion of the glass sheet with shaping means so as to pre-shape the extending portion of the glass sheet;
   bringing the glass sheet on the platen to an elevated essentially horizontal orientation with the glass sheet on the underside of the platen;
   bringing into vertical alignment with and beneath the glass sheet held on the platen a shaping mold having a contour defining the desired contour for the glass sheet; and
   releasing the glass sheet from the platen so as to fall onto the shaping mold and conform to the contour defined by the shaping mold.

2. The method of claim 1 wherein the glass sheet is lifted on the platen to bring the extending portion of the glass sheet into engagement with stationary shaping means which exterts a bending force on the extending portion of the glass sheet.

3. The method of claim 1 wherein lifting means urge the extending portion of the glass sheet into engagement with contoured shaping means as the glass sheet is held on the flat platen.

4. The method of claim 3 wherein the glass sheet is lifted by the platen into proximity to the curved shaping means.

5. The method of claim 4 wherein the lifting means rises with the glass sheet and the platen so as to engage and minimize drooping of the extending portion of the glass sheet.

6. The method of claim 3 wherein the lifting means is pivoted to urge the extending portions of the glass sheet into engagement with the curved shaping means.

7. The method of claim 3 wherein a concentrated line of heating is applied to the glass sheet as it is held on the platen so as to produce a line of sharp bending.

8. The method of claim 1 wherein the heated glass sheet is brought to rest on a layer of hot gases in alignment with the flat platen prior to being engaged by the flat platen.

9. An apparatus for shaping glass sheets comprising:
    a furnace for heating glass sheets to a softened condition;

support means adjacent the furnace for supporting heated glass sheets;

conveyor means for transferring glass sheets from the furnace to the support means;

a platen having a flat, perforated plate on one side thereof and an enclosed interior space in communication with a source of vacuum;

means for bringing the flat, perforated plate and a side of a glass sheet into close proximity to each other so as to transfer support of a major portion of the glass sheet from the support means to the platen with a portion of the glass sheet extending beyond a side of the platen;

shaping means aligned with the extending portion of the glass sheet and adapted to engage and pre-shape the extending portion of the glass sheet;

means for bringing the pre-shaped glass sheet on the platen into a generally horizontal orientation, with the glass sheet on the underside of the platen;

a shaping mold having upwardly facing shaping surfaces defining the desired curvature and corresponding to the shape of the glass sheet; and shuttle means for alternately bringing the platen and the shaping mold into and out of superimposed, vertically spaced relationship to each other, wherein the shaping mold in the superimposed position is supported at an elevation below the platen so as to receive and shape a glass sheet dropped from the platen.

10. The apparatus of claim 9 wherein said means for bringing the platen and the glass sheet into close proximity to each other comprises elevator means for translating the platen into and out of proximity to the support means, and said shaping means comprises a stationary shaping element having a contoured shaping surface supported adjacent to the path of the platen in alignment with the extending portion of the glass sheet carried on the platen.

11. The apparatus of claim 9 further including lifting means for urging the extending portion of the glass sheet into engagement with a curved shaping surface on said shaping means.

12. The apparatus of claim 11 wherein said lifting means include pivotable glass engaging elements associated with actuating means for pivoting the glass engaging elements into proximity to the shaping means.

13. The apparatus of claim 12 further including means for imparting a concentrated line of heating to a glass sheet mounted so as to come into close proximity to a glass sheet supported on the platen.

* * * * *